United States Patent [19]

Lyon

[11] 4,419,795
[45] Dec. 13, 1983

[54] CLAMPS FOR CABLES, PIPES AND THE LIKE

[75] Inventor: Robert C. Lyon, Wigan, England

[73] Assignee: BICC Limited, London, England

[21] Appl. No.: 293,108

[22] Filed: Aug. 17, 1981

[30] Foreign Application Priority Data

Aug. 27, 1980 [GB] United Kingdom ................. 8027683

[51] Int. Cl.³ ............................................. A44B 21/00
[52] U.S. Cl. ..................................... 24/530; 411/427; 24/486
[58] Field of Search ................. 24/263 A, 135 N, 136; 411/427; 248/74 R, 74 A; 269/60, 56

[56] References Cited

U.S. PATENT DOCUMENTS 1,398,604 11/1921 Schweinert ........................ 411/427
2,476,863 7/1949 Hawes .............................. 24/263 A
2,679,872 6/1954 Sutcliffe ............................ 24/263 A
4,269,248 5/1981 MacLean et al. ................... 411/427

FOREIGN PATENT DOCUMENTS 626290 9/1978 U.S.S.R. .............................. 411/427

Primary Examiner—Jay N. Eskovitz
Attorney, Agent, or Firm—Buell, Blenko, Ziesenheim & Beck

[57] ABSTRACT

A clamp for securing at least one cable to a support comprises a channel member having an apertured base and limbs shaped at their free ends for engagement with the support, and a sub-assembly comprising a screw a saddle captive on the end of the screw remote from the screw head and positioned inside the channel member, and a nut threaded on the shank of the screw between the screw head and the saddle, the aperture in the base of the channel being large enough to permit passage of the head of the screw but not so large as to permit passage of the nut.

6 Claims, 3 Drawing Figures

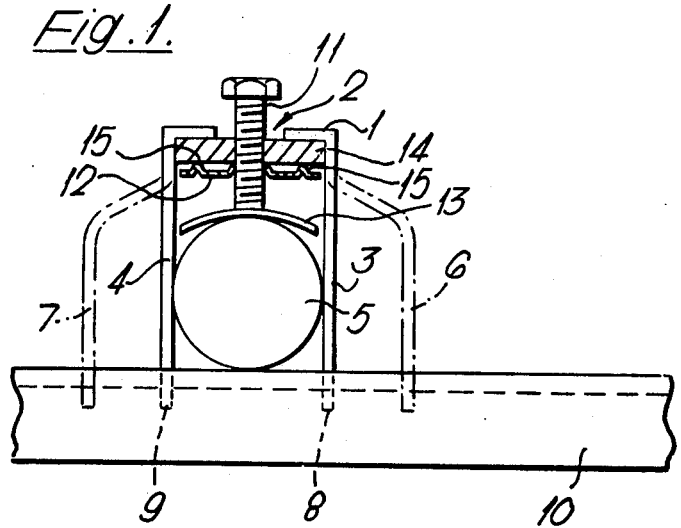
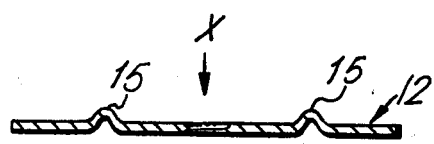
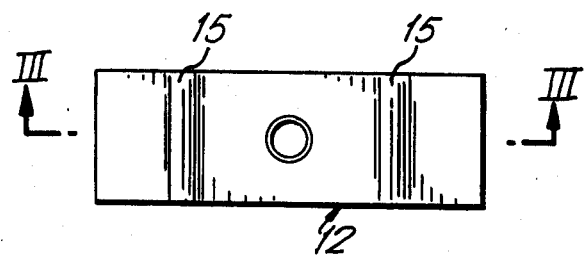

CLAMPS FOR CABLES, PIPES AND THE LIKE

This invention relates to clamps for securing cables, pipes and the like (hereinafter, for convenience, referred to as cables) and is particularly concerned with clamps of the kind comprising a channel member having limbs which in use lie one on each side of the cable or cables to be secured and which are shaped at their free ends for engagement with a support, and a saddle positioned inside the channel member and urged towards the free ends of the limbs by a screw bearing on the base of the channel, to secure the cable or cables between the saddle and the support.

This type of clamp has the advantages that it only needs to be slightly wider than the cable or cables to be secured, and that it can be mounted and secured quickly as only one easily accessible screw needs to be tightened. Its main disadvantage is that a great variety of shapes and sizes are required to cater for variations in the shape and size of the support (which might be, among other things, an angle member, channel, girder, ladder rung, cable tray or structural tube) as well as in the number, size and cross-sectional shape of the cable or cables, hence requiring large stocks, at great expense, to be kept to cover a wide range of sizes and shapes of cables and supports. Some designs currently on the market are liable to slacken due to creep when used on thermoplastic-sheathed cables. Other known designs, which incorporate a spring to avoid the risk of slackening, can disintegrate if the limbs are splayed apart during attempted fitting.

In accordance with the invention, a clamp for securing at least one cable to a support comprises a channel member having an apertured base and limbs shaped at their free ends for engagement with the support, and a sub-assembly comprising a screw, a saddle captive on the end of the screw remote from the screw head and positioned inside the channel member, and a nut threaded on the shank of the screw between the screw head and the saddle, the aperture in the base of the channel being large enough to permit passage of the head of the screw, but not so large as to permit passage of the nut.

In this way the relatively expensive screw and saddle sub-assembly is separable from the channel member and can be stocked separately; it may be the same for a considerable number of shapes and sizes of channel member, so that only the relatively cheap channel members need be stocked in large numbers to cover a wide range of sizes and shapes of cables and supports.

In use, the sub-assembly is positioned inside the channel member and the screw head passed through the aperture; the limbs of the channel member are engaged with the support to straddle the cable or cables on the support; on turning the screw head relative to the nut so that the separation of the nut and the screw head is reduced, the saddle is urged towards the cable or cables to secure the cable or cables between the saddle and the support, and the nut bears directly or indirectly on the inside of the base of the channel to tighten the clamp.

Preferably the nut is rectangular or otherwise shaped to engage the limbs of the channel to prevent rotation of the nut when the screw is rotated.

In order to provide compensation against creep when required, the sub-assembly preferably includes a resilient member located on the side of the nut nearer the screw head, so that the nut bears on the channel base through the resilient member. Preferably, this resilient member is secured in the sub-assembly by being captive between the screw head and the nut and/or being bonded or otherwise secured to the nut. The resilient member is preferably of a rubbery polymeric material, such as polychloroprene. Alternatively, the resilient member may be a compression spring.

Preferably, the nut comprises a slightly flexible, sheet-metal member having a threaded aperture for engaging the screw and spaced from the aperture on at least one face of the nut at least one upstanding bearing surface comprising a minor part of the surface area of said face, which can bear on the base of the channel or on the resilient member. On tightening the screw, the upstanding bearing surface of the nut bears on the base of the channel, or on the resilient member, and then the nut flexes in such a way that it locks the screw against unintentional rotation. Preferably, said face of the nut has two upstanding bearing surfaces in the form of two ridges of the same height, substantially parallel to one another, and equally spaced on opposite sides of the axis of the aperture. This invention also includes a nut as hereinbefore disclosed.

The invention also inclues a kit of parts consisting of a plurality of clamping means each comprising a sub-assembly as hereinbefore defined, all the sub-assemblies being alike, and a larger number of channel members all as hereinbefore defined and all dimensioned for use with the said sub-assemblies but including at least two channel members that differ in the spacing and/or length and/or the support engaging shapes of the limbs.

The invention further includes an installation comprising at least one cable, supported by one or more of the clamps as hereinbefore described.

The invention is now described, by way of example, with reference to the accompanying drawing in which:

FIG. 1 is a side view of a clamp for securing at least one cable.

FIG. 2 is a plan view of a nut in accordance with the invention; and

FIG. 3 is a cross-sectional view on the line III—III in FIG. 2.

Referring to the FIG. 1, the clamp comprises stamped sheet metal channel member having a base 1 with a clearance aperture 2 and limbs 3, 4 which may be straight to accommodate a small cable 5 or stepped outwards as shown in dotted outline 6, 7 to secure a larger cable (not shown), or two or more smaller cables (not shown) positioned side by side.

The free ends of the limbs 8, 9 are shaped to engage a support 10.

The remainder of the clamp consists of an inseparable sub-assembly comprising a screw 11 (with a head small enough to pass through the aperture 2), a rectangular sheet metal nut 12 threaded on the shank of the screw, a saddle 13 captively attached to the end of the shank, and a rectangular polychloroprene washer 14 push-fitted on the shank of the screw between its head and the nut, such that the nut bears on the base 1 of the channel through the washer, so providing resilience to compensate for any creep in the cable after clamping.

The nut 12 (FIGS. 2 and 3) is formed with stamped ridges 15 which provide upstanding bearing surfaces which bear on the washer 14. When the screw 11 and nut 12 are tight, further rotation of the screw in the tightening direction causes the nut to flex, thereby locking it to the screw to prevent unintentional rotation of the screw relative to the nut.

Although the bearing surface is shown as being defined by two parallel ridges, it could be defined by any other suitable means, for example by a raised circular ridge which is coaxial with, and spaced from, the aperture in the nut. Further although the nut is shown as rectangular, this invention is not restricted to rectangular nuts, as any shape can be used depending on the particular requirements.

For convenience of handling, the sub-assembly and the channel member may be secured together in any convenient manner, for example by a slotted plastics washer (not shown) force-fitted on the shank of the screw after assembly and bearing on the outside of the base of the channel member.

What I claim as my invention is:

1. A clamp for securing at least one cable (as hereinbefore defined) to a support comprises a channel member having an apertured base and limbs shaped at their free ends for engagement with the support, and a sub-assembly comprising a screw, a saddle captive on the end of the screw remote from the screw head and positioned inside the channel member, a nut threaded on the shank of the screw between the screw head and the saddle, the aperture in the base of the channel being large enough to permit passage of the head of the screw but not so large as to permit passage of the nut and the nut comprising a slightly flexible, sheet-metal member having a threaded aperture and spaced from the aperture on at least one face of the nut, at least one upstanding bearing surface comprising a minor part of the surface area of said face, which can bear on the base of the channel.

2. A clamp as claimed in claim 1, in which the sub-assembly includes a resilient member located on the side of the nut nearer the screw head, so that the nut bears on the channel base through the resilient member.

3. A clamp as claimed in claim 2, in which the resilient member is secured in the sub-assembly by being captive between the screw head and the nut and/or being bonded or otherwise secured to the nut.

4. A clamp as claimed in claim 2 or claim 3, in which the resilient member is a rubbery polymeric material.

5. A clamp as claimed in claim 1, in which the nut is rectangular or otherwise shaped to engage the limbs of the channel to prevent rotation of the nut when the screw is rotated.

6. A clamp as claimed in claim 1, in which said face of the nut has two upstanding surfaces in the form of two ridges of the same height, substantially parallel to one another, and equally spaced on opposite sides of the axis of the aperture in the nut.

* * * * *